UNITED STATES PATENT OFFICE.

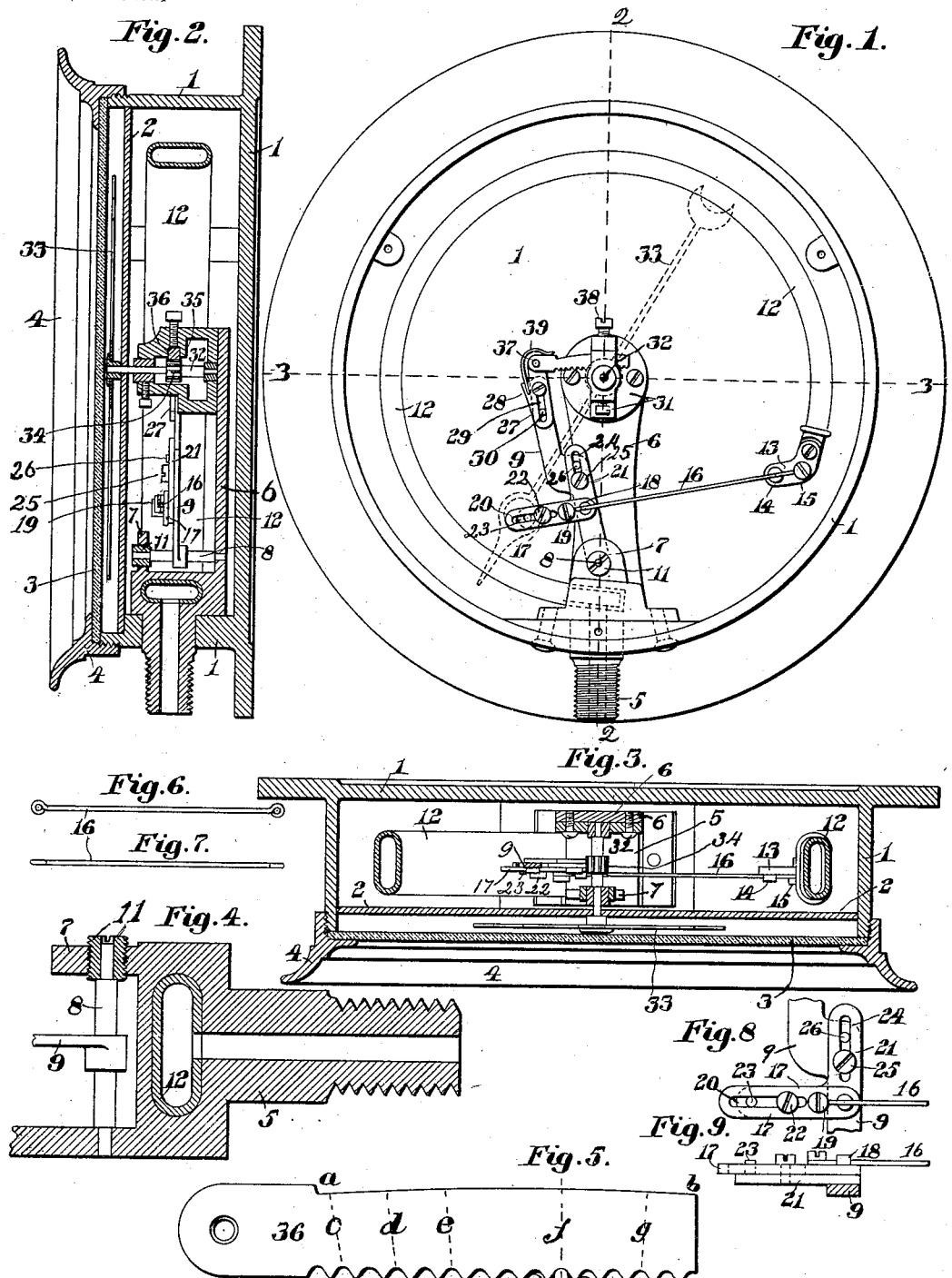

FRANK H. HASKELL, OF BOSTON, MASSACHUSETTS.

PRESSURE-GAGE.

SPECIFICATION forming part of Letters Patent No. 697,623, dated April 15, 1902.

Application filed January 17, 1902. Serial No. 90,167. (No model.)

*To all whom it may concern:*

Be it known that I, FRANK H. HASKELL, of Boston, in the county of Suffolk and State of Massachusetts, have invented certain new and useful Improvements in Pressure-Gages, of which the following, taken in connection with the accompanying drawings, is a specification.

My invention relates to pressure-gages, and has for its object a reduction in the number of joints that are subject to wear, thereby reducing to a minimum the liability of imperfect indication by the index-finger, to provide suitable adjustments for the index-operating mechanism, and to render it practical to use a heavier Bourdon spring-tube to indicate a given pressure than has heretofore been the practice; and it consists in certain novel features of construction, arrangement, and combination of parts, which will be readily understood by reference to the description of the accompanying drawings and to the claims hereto appended and in which my invention is clearly pointed out.

Figure 1 of the drawings is an elevation of a pressure-gage embodying my invention with the dial, the glass front, and the glass-holding ring removed. Fig. 2 is a section on line 2 2 on Fig. 1 with the dial, the glass, and the glass-holding ring in position. Fig. 3 is a similar section on line 3 3 on Fig. 1. Fig. 4 is a vertical longitudinal section of the socket and stand, in which is mounted the rack-operating lever, drawn to an enlarged scale. Fig. 5 is an elevation of the rack and pinion for operating the index-finger, also drawn to a still larger scale. Figs. 6 and 7 are respectively an elevation and a plan of the flexible connecting-rod for connecting the movable end of the Bourdon spring-tube to the rack-operating lever, and Figs. 8 and 9 are respectively an elevation and an inverted plan of the adjustable connection of the rack-operating lever and the rod connecting the Bourdon spring.

In the drawings, 1 represents the main body of the casing, 2 is the dial, 3 is the glass front, and 4 is the glass-holding ring, all of usual construction.

The casing 1 has secured therein the socket 5, having formed in one piece therewith the arm 6 and the ear 7, said arm and ear having mounted in bearings therein the shaft 8, upon which is firmly secured the lever 9, through which a reciprocating movement is imparted to the rack 36. The ear 7 has a hole formed therein of a diameter sufficiently large to permit the shaft 8 to be passed upward through the same at an angle to a sufficient distance to permit its lower journal to be dropped into the bearing therefor in the arm 6. The hole in said ear 7 is internally threaded and has fitted thereto the threaded bushing 11, in which the upper journal of the shaft 8 has its bearing, said bushing being readily adjustable vertically to take up any wear that may occur upon the shoulders of said shaft. The shaft 8 is arranged in as near proximity to the socket-stand 5 as may be practicable in order to increase the length of the lever 9, whereby less movement of the movable end of the Bourdon spring-tube will be required, and consequently a heavier spring may be employed.

The Bourdon spring-tube 12, of ordinary construction, has one end firmly set in the socket 5 in the usual manner and has formed upon or secured to its other end the plate 13, in which is set the slotted stud 14 and the clamping-screw 15, which passes through an eye in one end of the connecting-rod 16 and firmly secures it to said plate 13, said rod being prevented from moving about said screw 15 by being embraced by the forked stud 14, as shown in Figs. 1 and 3. The rod 16 is made of such material and of such size as to render it sufficiently flexible to enable it to spring between its two connections as the point of connection thereof to the rack-operating lever moves through an arc of a circle, and the movable end of the spring-tube is moved outward and upward without moving about its connection to said lever and has its other end secured to the plate 17 by means of the forked or slotted stud 18 and the clamping-screw 19, said plate 17 having formed therein a slot 20 and is adjustably secured to one arm of the plate 21 by means of the clamping-screw 22 and the steady-pin 23, the other arm of the plate 21 having formed therein the slot 24 and is adjustably secured to the lever 9 by means of the clamping-screw 25, which passes through said slot and is screwed into the lever 9, and the steady-pin 26, set in said lever and projecting into said slot in said plate 21, all as shown in Figs. 1, 2, 8, and 9.

The lever 9 has adjustably secured to its movable end the extension-plate 27 by means of the clamping-screw 28, which passes through a slot 29, formed in said extension, and screws into said lever, and the steady-pin 30, set in said lever and projecting into said slot 29, as shown in Figs. 1 and 2.

The arm 6 of the socket 5 extends to the center of the casing 1 and has secured thereto the stand 31, in suitable bearings in which is mounted in a well-known manner the spindle 32, upon the outer end of which is mounted the index-finger 33, between the dial 2 and the glass front 3, in a well-known manner. The spindle 32 has firmly secured thereon between its two bearings in the stand 31 the pinion 34, and said stand has formed therein a suitable guideway or bearing 35 for the rack 36, one end of which is pivoted to the extension of the lever 9 at 37. The pinion 34 is provided with teeth, the ends of which are rounded or form arcs of circles, and the bottoms of the spaces between the teeth of the rack are in the form of arcs of circles, which are intended to rest directly upon the ends of the teeth of the pinion, said rack being held in said position of contact with said pinion by the set-screw 38 and the light spring 39. As the movable end of the lever to which said rack is pivoted moves in the arc of a circle, it follows that the angle of movement of said rack varies in different positions of said lever, so that the pivoted end of said rack rises or falls as it is moved to and fro by the vibrations of said lever. To enable the rack at all times to rest upon the teeth of the pinion and still permit a free movement of said rack and pinion, I form the teeth of said rack in the shape of a letter V with a slightly-rounded point, and the upper side of the rack, against which the screw 38 bears lightly, is curved from $a$ to $b$, so that the distance between the rounded bottom of the space between any two teeth of the rack and the upper surface of said rack shall be the same when measured on a line at the same angle to the pitch-line of said rack which a line drawn through the axis of the pinion and the center line of the screw 38 bears to said pitch-line when the rack is moved to bring each successive rack-tooth between said pinion and the screw 38, as indicated by dotted lines $c$, $d$, $e$, $f$, and $g$ on Fig 5. The extension-plate 27 has secured thereto the light curved spring 39, which bears lightly upon the upper surface of the rack to press it lightly downward upon the pinion.

The advantages of my invention are as follows: By mounting the fulcrum of the lever which operates the rack in near proximity to the socket 5 and connecting the rod 16 to said lever between its fulcrum and its movable end a greater leverage of said lever is obtained in a given size of case than when the connection of said rod and lever is between the fulcrum of said lever and the socket, as heretofore practiced, and consequently a heavier Bourdon spring-tube is required, which is an advantage because of the greater durability of said spring-tube. By the adjustable connection of the rod 16 to the lever 9 the leverage of said lever may be readily varied to meet the conditions of any particular case, and the normal position of the rack may be varied to suit varying conditions, and by the adjustment of the extension-plate 27 another means of varying the leverage of said lever 9 is provided to suit different conditions. By making the rod 16 of such material and construction as to render it flexible between its two ends and securing its two ends to the spring-tube 12 and the lever 9, so that there is no movement of said rod about its connections to said parts, two points of wear that heretofore have caused more or less trouble are eliminated, and by mounting the upper journal of the shaft in a threaded bushing fitted to a threaded hole in the ear 7 of the socket the socket 5, arm 6, and the ear 7 may be made in one piece and the shaft 8 may be readily placed in position and said bushing may be readily adjusted to take up any endwise wear of the shoulders of said shaft. By the construction of the rack and pinion as hereinbefore described a close contact of said rack and pinion is maintained, and though the position of the rack relative to a horizontal plane is constantly changing as it reciprocates there is no binding of said rack in its bearings, and it rests in all positions of its reciprocation upon the teeth of the pinion, and all lateral play or rattling of said rack in its bearing is obviated.

The connecting-rod 16 may be made of spring-wire, as shown, or of flat ribbon of spring material.

The operation of my invention will be readily understood from the foregoing without further description here.

Instead of extending the arm 6 to the center of the casing it may extend only far enough to form an ear, in which the lower journal of the shaft 8 has its bearing, and the stand 31 may be secured directly to the bottom or back of the casing, if desired.

What I claim as new, and desire to secure by Letters Patent of the United States, is—

1. In a pressure-gage, the combination with a single Bourdon-gage spring-tube extending around approximately three-fourths of a circle; of a tube-supporting socket; a shaft-supporting stand formed in one piece with said socket; an index-carrying shaft; a pinion mounted on said shaft; a rack engaging said pinion; a rack-operating lever fulcrumed in near proximity to said socket; and a rod having one end pivoted directly to the movable end of said spring-tube and its other end pivoted to said lever between its fulcrum and its movable end.

2. In a pressure-gage, the combination with a Bourdon spring-tube extending around approximately three-fourths of a circle; of a spring-tube-supporting socket; a shaft-supporting stand, formed in one piece with said socket, the outer ear of said stand being provided with a threaded hole therein of greater diameter than said shaft; a shaft provided with shouldered journals, and mounted in said stand; a threaded tubular bushing fitted to the threaded hole in said outer ear and forming a bearing for the outer journal of said shaft; a rack-operating lever mounted on said shaft; and a rod pivoted at one end to the movable end of said spring-tube, and at its other end to said lever between its fulcrum and its movable end.

3. In a pressure-gage, the combination with a Bourdon spring-tube, a socket for supporting the same, a dial, an index-finger, its spindle, a pinion mounted on said spindle, and a rack and lever for rotating said spindle, of a flexible connection between the movable end of the Bourdon spring and said pinion-operating lever, the ends of said flexible connection being rigidly clamped, one to said spring, and the other to said lever.

4. In a pressure-gage, the combination with an index-finger, its spindle, a pinion mounted on said spindle, a Bourdon spring-tube its supporting socket and stand, a lever mounted in bearings in said stand, and a reciprocating rack operated by said lever, of the plate 13 firmly secured to the movable end of said spring, and provided with the slotted stud 14, and the clamping-screw 15; the two-armed plate 21, adjustably secured to the rack-operating lever; the slotted plate 17 adjustably secured to the plate 21, and provided with the slotted stud 18 and the clamping-screw 19; and the flexible connection 16, provided with an eye at each end to receive the clamping-screws 15 and 19, said flexible connection, being embraced by the slotted studs 14 and 18, in near proximity to the clamping-screws 15 and 19 respectively.

5. In a pressure-gage, the combination with a Bourdon spring-tube, its supporting-socket, and a shaft-supporting stand, a lever fulcrumed in said stand, a connection between the movable end of said spring-tube and said lever; an index-finger, and its spindle, of a pinion provided with teeth having rounded outer ends; and a reciprocating rack provided with V-shaped teeth with the spaces between said teeth curved to arcs of circles to rest upon the rounded outer ends of said pinion-teeth, said rack being pivoted by one end to the movable end of said lever; a stop to limit the upward movement of said rack at its point of contact with said pinion; and a spring carried by said lever and bearing upon the upper side of said rack to press it into contact with the teeth of said pinion.

6. In a pressure-gage the combination with a Bourdon spring-tube, its supporting socket and stand, a lever fulcrumed in said stand, a connection between the movable end of said spring-tube and said lever, an index-finger, and its spindle, of the pinion 34 provided with teeth having rounded ends; and the reciprocating rack 36 provided with V-shaped teeth with the spaces between said teeth curved to the arc of a circle, and its upper surface curved longitudinally to compensate for the rise and fall of its pivoted end, due to the arc described by the movable end of its operating-lever.

In testimony whereof I have signed my name to this specification, in the presence of two subscribing witnesses, on this 15th day of January, A. D. 1902.

FRANK H. HASKELL.

Witnesses:
N. C. LOMBARD,
WILLIAM W. WEBB.